United States Patent [19]
Henderson

[11] Patent Number: 5,897,648
[45] Date of Patent: Apr. 27, 1999

[54] APPARATUS AND METHOD FOR EDITING ELECTRONIC DOCUMENTS

[75] Inventor: Phillip L. Henderson, Doylestown, Pa.

[73] Assignee: Numonics Corporation, Montgomeryville, Pa.

[21] Appl. No.: 08/770,487

[22] Filed: Dec. 20, 1996

Related U.S. Application Data

[63] Continuation of application No. 08/266,138, Jun. 27, 1994.

[51] Int. Cl.⁶ .................................................. G06F 17/24
[52] U.S. Cl. .......................... 707/530; 345/178; 345/179; 345/330; 178/18.01; 178/18.03; 382/188; 382/189
[58] Field of Search .................................. 705/1, 33, 34, 705/40, 95; 707/530, 517, 531; 382/185, 186, 188, 189; 345/173, 178, 179, 118, 126, 330; 178/18.01, 18.03

[56] References Cited

U.S. PATENT DOCUMENTS

| | | | |
|---|---|---|---|
| Re. 34,476 | 12/1993 | Norwood | 328/186 |
| 3,851,097 | 11/1974 | Rodgers | 178/19 |
| 4,455,452 | 6/1984 | Schuyler | 178/18 |
| 4,552,991 | 11/1985 | Hulls | 178/19 |
| 4,570,033 | 2/1986 | Hulls | 178/19 |
| 4,600,807 | 7/1986 | Kable | 178/19 |
| 4,609,779 | 9/1986 | Rogers | 379/100 |
| 4,622,436 | 11/1986 | Flurry | 364/900 |
| 4,688,933 | 8/1987 | Lapeyre | 356/1 |
| 4,723,836 | 2/1988 | Kono et al. | 350/331 |
| 4,727,588 | 2/1988 | Fox et al. | 382/13 |
| 4,734,789 | 3/1988 | Smith et al. | 358/300 |
| 4,821,335 | 4/1989 | Yamazaki et al. | 382/186 |
| 4,827,410 | 5/1989 | Corren | 364/200 |
| 4,841,290 | 6/1989 | Nakano et al. | 340/707 |
| 4,845,684 | 7/1989 | Garwin et al. | 367/137 |
| 4,873,398 | 10/1989 | Hubby, Jr. | 178/18 |
| 4,878,242 | 10/1989 | Springer et al. | 379/204 |
| 4,884,146 | 11/1989 | Yatsunami | 358/400 |
| 4,969,013 | 11/1990 | Tsilibes | 355/218 |
| 4,980,781 | 12/1990 | Yamamoto et al. | 358/474 |
| 5,027,198 | 6/1991 | Yoshioka | 358/85 |
| 5,051,736 | 9/1991 | Bennett et al. | 340/707 |
| 5,063,600 | 11/1991 | Norwood | 382/186 |
| 5,073,770 | 12/1991 | Lowbner | 340/706 |
| 5,115,107 | 5/1992 | Crooks et al. | 345/178 |
| 5,153,386 | 10/1992 | Siefer et al. | 178/18 |
| 5,155,813 | 10/1992 | Donoghue et al. | 395/275 |
| 5,159,322 | 10/1992 | Loebner | 340/706 |
| 5,164,585 | 11/1992 | Lieu | 250/221 |
| 5,181,129 | 1/1993 | Sato et al. | 358/494 |
| 5,239,373 | 8/1993 | Tang et al. | 358/93 |
| 5,272,470 | 12/1993 | Zetts | 345/173 |
| 5,274,362 | 12/1993 | Potvin | 345/178 |
| 5,455,906 | 10/1995 | Usuda | 395/162 |
| 5,525,764 | 6/1996 | Junkins et al. | 178/18 |

*Primary Examiner*—Joseph Thomas
*Attorney, Agent, or Firm*—Paul & Paul

[57] ABSTRACT

A system is disclosed for the editing of electronic documents wherein the hardcopy of an original document is scanned into digital form to provide an electronic version of the document. The original document is then placed on an x-y digitizer with the position of the original document being correlated with the electronic version of the document in order to provide corresponding scaling, rotation and offset of the documents. The original document is then edited with a digitizer pen that marks the original document while at the same time converting the handwritten edit into digital form. The digitized edit is then combined with the electronic version of the document to produce an edited electronic document that can be displayed on a local and/or remote computer screen or the like. The system is useful in such applications as teleconferencing, where it is desired to edit the electronic version of a document that is displayed at multiple locations. Other applications include editing of digitized medical documents and graphical images such as X-rays, creating and editing drawings for engineering and other purposes, and editing digitized documents for archival purposes.

22 Claims, 5 Drawing Sheets

APPARATUS AND METHOD FOR EDITING ELECTRONIC DOCUMENTS

This application is a continuation, of application Ser. No. 08/266,138, filed Jun. 27, 1994.

FIELD OF THE INVENTION

The present invention relates to the electronic editing of documents. More particularly, the invention relates to the use of an x-y digitizer to edit an original or hardcopy of a document that has been previously stored in electronic form.

BACKGROUND OF THE INVENTION

With the increasing use of computers and electronic communication equipment, documents are increasingly being stored, transmitted and displayed in electronic form. In many instances, it is desired to convert the original hardcopy of a document into electronic or digital form in order to store, transmit and/or display the document more efficiently. However, once an original document has been converted to digital form, it is often necessary to edit or annotate the digital version of the document. For example, it may be desired to electronically transmit the digital form of a document by telephone or computer network to a remote location where the document is displayed on a computer screen or the like, and then incorporate handwritten notations on the displayed document. As another example, where the original version of a document is to be stored in digital form for archival purposes, it may also be desired to digitally store any handwritten markings made on the original document. As a further example, it may be desired to create a drawing or other document by hand, while at the same time creating and storing a digital version of the document.

One area of increasing interest is teleconferencing systems, which allow multiple groups in remote locations to communicate with each other. The simplest teleconferencing systems use speaker telephones patched together in a conference call, while more elaborate systems use specially equipped rooms with full motion video, high fidelity sound and very high capacity communication links to produce broadcast quality sound and video interconnections among groups in two or more locations. The objective of these systems is to provide a level of communication among remote individuals or groups of people which approaches the level achieved in face-to-face meetings. An essential part of many meetings is the ability to share documents and to interact with the documents in some manner. For example, participants in a face-to-face meeting may underline or circle parts of a document for emphasis, or make corrections or annotations in the margin. In the case of a technical drawing, the participants may sketch in changes or additions. During a teleconference, there is a need for the participants to edit documents in such a manner that allows persons at each remote location to see the annotations.

Another area of increasing interest is in the medical field, where X-rays and other graphical images are increasingly being stored in digital form to simplify handling and archiving. However, doctors often prefer to work with the original X-ray rather than with a displayed digital image. It is very common for a doctor to make notes and marks on an X-ray in order to record or explain the doctor's analysis. A need exists to store the doctor's notes and markings in digital form along with the document upon which the markings are made.

Various digitizers are known in the prior art for converting the x-y position of a stylus into digital form. In these digitizers, a stylus simulating a writing instrument is drawn or selectively positioned on the digitizer surface. The device responds to the position of the stylus to generate digitized signals that are typically conveyed to a host computer. Such x-y digitizers are usually activated by electromagnetic coupling between the stylus and the work surface, but can also be activated by electrostatic coupling, touch, optical, and ultrasonic means.

Conventional electromagnetic x-y digitizers are disclosed in U.S. Pat. Nos. 3,851,097, 4,552,991, 4,570,033, 4,600,807, 4,633,436, 4,727,588, 4,841,290, 5,153,386, 5,155,813 and 5,272,470.

Touch controlled x-y digitizers are disclosed in U.S. Pat. Nos. 4,455,452 and 5,274,362.

Optical x-y digitizers are disclosed in U.S. Pat. Nos. 4,688,933, 5,051,736, 5,073,770, 5,159,322 and 5,164,585.

An ultrasonic x-y digitizer tablet is disclosed in U.S. Pat. No. 4,845,684.

Several conventional x-y digitizers have been used in conjunction with computer display screens, wherein the digitizer is mounted on or behind the screen. When the digitizer is mounted on the display screen, it is provided in the form of a transparent sheet. Such overlapping digitizers and display screens are disclosed in U.S. Pat. Nos. 4,723,836, 4,827,410, 4,873,398 and Re 34,476.

The use of a transparent x-y digitizer mounted on a computer screen to edit an electronic version of a document displayed on the screen is known in the prior art, as disclosed in U.S. Pat. Nos. 5,027,198 and 5,239,373. In these systems, editing is performed directly on the computer screen rather than on the hardcopy of a document.

The above-noted U.S. patents are incorporated by reference herein.

The present invention has been developed in view of the foregoing, and to overcome other deficiencies of the prior art.

SUMMARY OF THE INVENTION

An object of the present invention is to provide a novel apparatus and method for editing documents.

Another object of the present invention is to provide an apparatus for editing documents comprising means for providing an electronic version of an original document, means for positioning the original document on an x-y digitizer, means for correlating the position of the original document with the electronic version of the document, means for editing the original document, means for digitizing the edit made to the original document, and means for combining the digitized edit made to the original document and the electronic version of the document to produce an edited electronic document. Means may also be provided for displaying the edited electronic document at local and/or remote locations.

Another object of the present invention is to provide a method for editing documents comprising the steps of providing an electronic version of an original document, positioning the original document on an x-y digitizer, correlating the position of the original document and the electronic version of the document, editing the original document, digitizing the edit made to the original document, and combining the digitized edit made to the original document and the electronic version of the original document to produce an edited electronic document. The method may also include the step of displaying the edited electronic document at local and/or remote locations.

In accordance with the present invention, annotations made on an original document are incorporated and displayed in the corresponding location on an electronic version of the document. The electronic document can be displayed at local and/or remote locations. The present invention is useful in many applications, including teleconferencing systems where it is desired to interact with a document that is displayed at multiple locations. Other applications include editing of digitized medical documents or graphical images such as X-rays, creating and editing drawings for engineering and other purposes, and editing digitized documents for archival purposes. A major advantage of the present invention is the ability to directly edit the hardcopy of a document while at the same time providing an electronic version of the edit. Since editors are often more comfortable marking a hardcopy document rather than editing an electronic document on a computer screen, the present invention provides an editing system that is easier to operate in comparison with prior art systems.

These and other objects of the present invention will become more readily apparent from the following description.

DETAILED DESCRIPTION OF THE PREFERRED EMBODIMENTS

Figure 1:
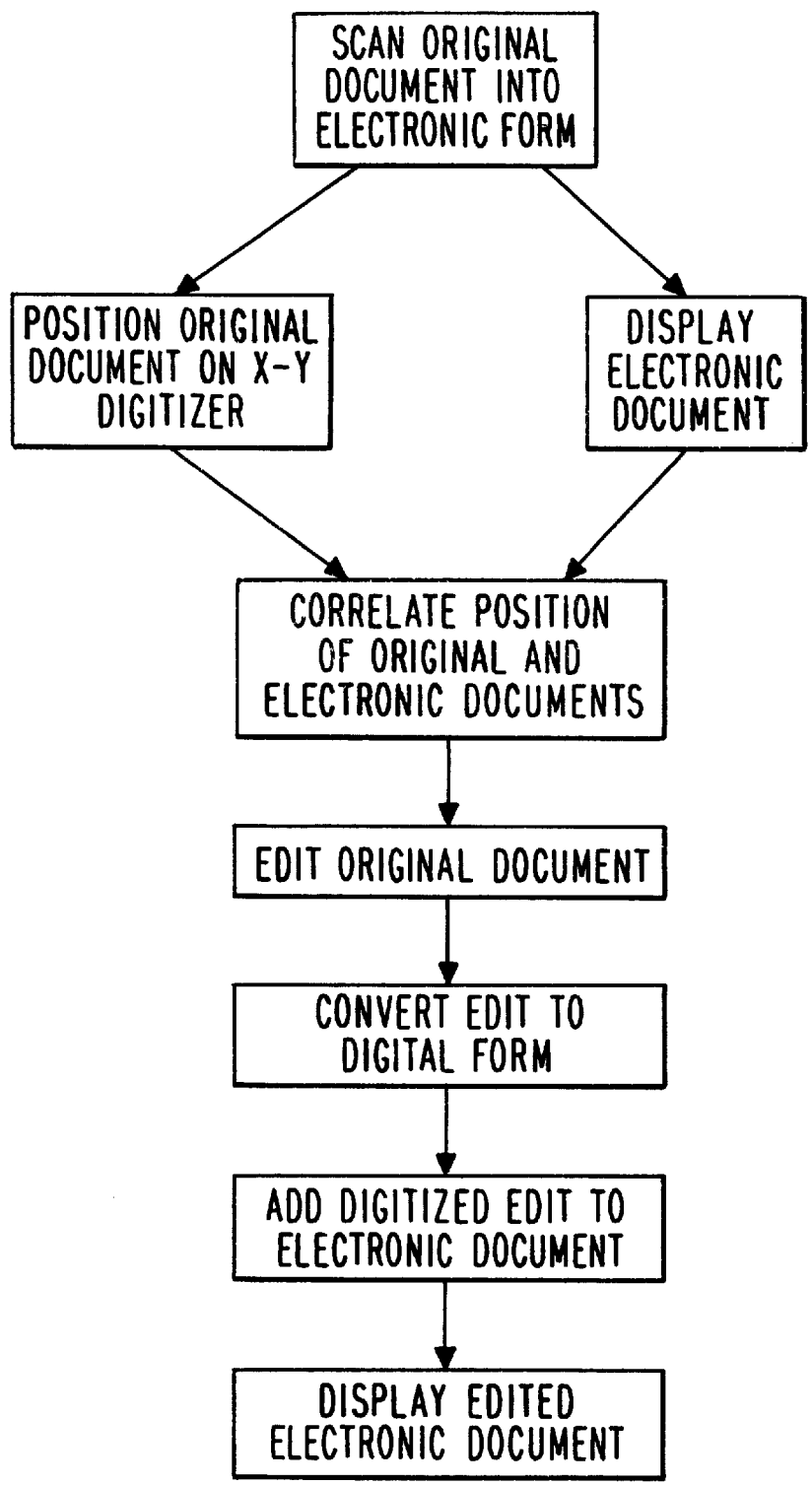
FIG. 1 is a schematic flow diagram illustrating an embodiment of the present invention.

FIG. 1 is a flow diagram in accordance with one embodiment of the present invention. As illustrated in FIG. 1, the original hardcopy of a document is also provided in electronic form. Typically, the original document is scanned into digital form by bit mapping methods or the like. However, the electronic version of the document may be provided by other means. For example, the digital document may be created first, followed by printing of the document to obtain a hardcopy thereof. The original document is then positioned in a fixed location on an x-y digitizer pad. At this stage, an image of the electronic version of the document may optionally be displayed on a computer screen or other suitable display device located adjacent to the x-y digitizer and/or remote from the x-y digitizer. Once the original document is positioned on the digitizer, its position must be correlated with the electronic version of the document. Such correlation ensures that the original and electronic documents correspond in scale, rotation and offset. This correlation may be achieved by various methods, including the identification of corresponding points on the original document and on the displayed image of the electronic document, as more fully described below. Once the scale, rotation and offset of the original and electronic documents are correlated, the original document may be edited while it is secured to the x-y digitizer surface. Editing is performed with a digitizer pen that, in conjunction with the digitizer surface, converts the handwritten edit into digital form. The digitized edit is then combined with the electronic version of the original document to produce an edited electronic document. This edited electronic document may then be displayed by means of a computer display screen or the like at local and/or remote locations.

By enabling the operator to mark directly on the hardcopy original document, the present invention provides an electronic editing system that more closely simulates the conventional editing of paper documents without the necessity of positioning a cursor on a computer screen as required in many prior art electronic editing systems.

The terms "original" and "hardcopy" are used broadly in accordance with the present invention to include various types of physical documents comprising paper, film, transparencies and the like. The documents may contain text, drawings and other graphical images. Examples of original or hardcopy documents include, but are not limited to, printed and/or handwritten text on paper, printed and/or handwritten drawings on paper, blueprints, X-ray films, photographic slides and transparencies.

The term "edit" is used broadly in accordance with the present invention to include various types of annotations, changes, additions, markings, sketches and the like made to a document. A document may thus be edited by adding, changing and/or removing material previously contained in the document. In addition, a document may be edited by adding text, drawings and/or other graphical images to an otherwise blank document.

The apparatus of the present invention comprises an x-y digitizer adapted for positioning a document thereon, a digitizer pen used in conjunction with the digitizer to edit a document mounted on the digitizer and, preferably, at least one display screen for displaying the electronic version of an edited document. In addition, the apparatus may include a scanner for initially converting an original document into electronic or digital form.

The x-y digitizer of the present invention may be of any suitable type such as electromagnetic, electrostatic, touch, optical, ultrasonic and the like, with electromagnetically actuated digitizers being preferred. For most applications, a digitizer having an opaque surface is suitable. However, in some applications such as editing of X-rays or photographic transparencies, a translucent, back-lit x-y digitizer may be used. The size of the digitizer surface may vary depending upon the size of the documents to be edited. The surface of the digitizer is preferably at least 8½×11 inches to accommodate standard sheets of paper. Where larger documents such as engineering drawings are to be edited, a larger digitizer surface may be provided. In a preferred embodiment, the surface of the digitizer is larger than the size of the documents to be edited in order to provide a border area that can be used to initiate various control commands when using software such as Windows™ and the like. A particularly preferred digitizer pad is provided by Numonics, Inc. under the tradename GraphicMaster™. The GraphicMaster™ provides a working area of 12×12 inches which provides ample room for a control area outside an 8.5×11 sheet of paper. It provides ample resolution and accuracy for the editing function and is available with a natural feeling pen-line stylus with a ballpoint pen refill. Its low profile form makes it unobtrusive in a normal office desktop environment.

The digitizer pad is preferably provided with means for securing a document to the pad in a fixed location. Suitable fasteners include mechanical clips such as those used on clip boards, adhesive strips and mechanical stops located at the edges and/or corners of a document.

Various types of digitizer pens may be used with the x-y digitizer of the present invention. A preferred digitizer pen includes a tip switch that actuates when a small amount of pressure is applied to the tip of the pen. The tip switch preferably requires only a small travel distance for actuation. The switch therefore preferably actuates when the digitizer pen is pressed just hard enough to mark on an original document. In this manner, the markings made on an original document can be converted to corresponding electrical signals with an "on" signal indicating that a mark has been made on the document and an "off" signal indicating that no mark has been made.

The digitizer pen may be corded, but is preferably cordless in order to provide easier operation. Multiple digitizer pens may optionally be provided corresponding to different colors, highlighters, erasers, etc., as discussed more fully below. The digitizer pen may be provided with a removable inking insert and an optional non-marking insert that can be used when an original document is not to be marked on.

The term "pen" is used in the broadest sense in accordance with the present invention and includes writing instruments such as ink pens, graphite pencils, wax pencils and the like, as well as non-marking instruments. Suitable digitizer pens also include cursors, fingers, pointers, light emitting pens, ultrasonic emitting pens and any other device that can be used to indicate the x-y coordinate position of the pen in relation to the x-y digitizer. In the preferred embodiment, the digitizer pen is provided in the form of an ink pen for marking the hardcopy of an original document.

The display screen used in accordance with a preferred embodiment of the present invention is preferably a CRT computer screen, but may also include displays such as LCD screens, projection screens and the like. Single or multiple display screens may be provided at local and/or remote locations. Where remote display screens are used, the electronic or digitized version of a document to be displayed may be transmitted to the remote location by conventional means such as by telephone and/or by computer network.

In accordance with a preferred embodiment of the present invention, a scanner is provided for converting the original document into digital form. The scanner preferably operates by conventional bit mapping or raster methods. Various types of scanners are suitable, including facsimile-type scanners, full color scanners and high gray scale resolution scanners. For most documents, facsimile-type scanners are preferred due to their relatively low cost. However, in certain applications, scanners that provide full color and/or high gray scale resolution may be preferred. For example, when digitizing a graphical image such as a medical X-ray, it may be desirable to use a scanner with high gray scale resolution.

Figure 2:
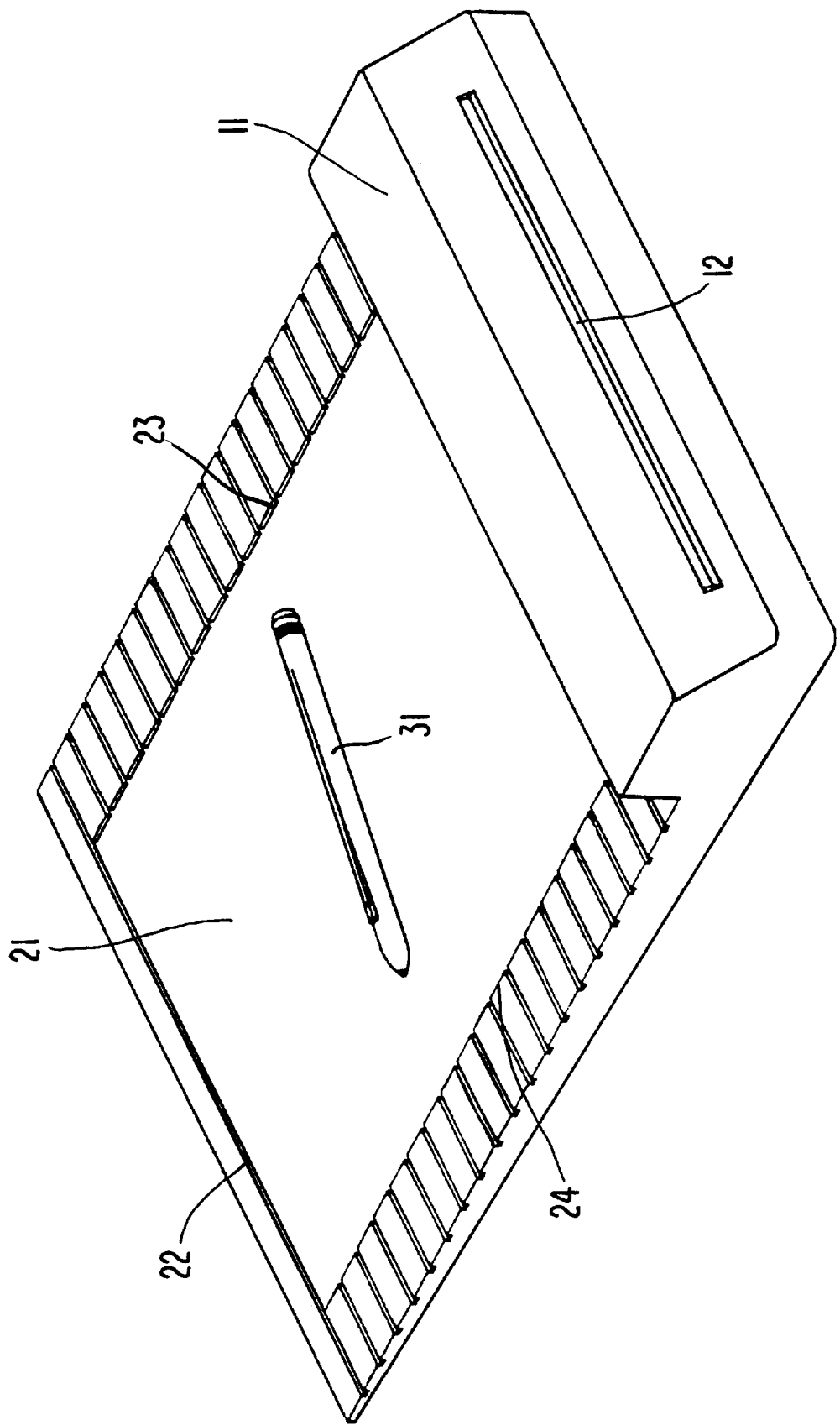
FIG. 2 is an orthogonal view of a combination scanner and x-y digitizer in accordance with an embodiment of the present invention.

A preferred scanner that also incorporates an x-y digitizer pad is shown in FIG. 2. In this embodiment, an original document is fed into the scanner 11 through the scanner input opening 12. The scanner is the sheet fed type which moves the document past a stationary scan head using rollers, as incorporated in many conventional facsimile machines. After passing the scan head, the document exits the scanner 11 and is deposited on the digitizer surface 21. The document may be placed in a known position on the digitizer surface 21 by positioning the document against mechanical stops 22, 23 and 24 along the edges and/or at the corners of the document. The mechanical stops 22, 23 and 24 may thus be used to position the document in a known rotational orientation and position on the x-y digitizer surface 21. Alternatively, an optical sensing system (not shown) may be built into the surface of the digitizer to locate the edges of the document. Thus, a document may be placed in a known position on the digitizer surface 21 in order for annotations made on the document to be properly located on the corresponding electronic version of the document, as more fully described below. The digitizer pen 31 may be used to edit the original document and to provide corresponding annotations on the electronic version of the document.

In an alternative embodiment, a line scanner may be used, wherein the original document is placed on an x-y digitizer pad and a moveable digitizing scanner is passed over the stationary document. Such a moveable scanner may be slidably mounted to the edges of the digitizer pad, or may be of the hand-held type that is freely moveable, as shown in FIG. 3.

Figure 3:
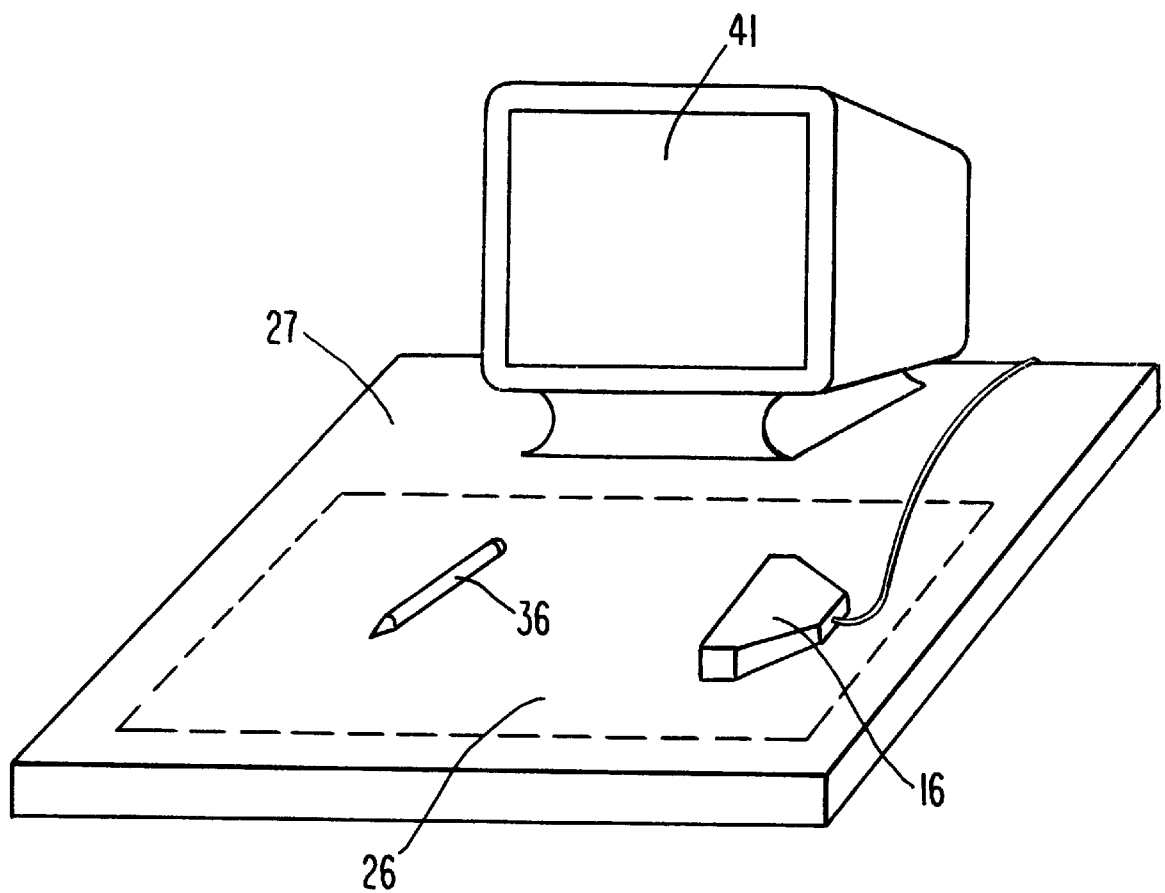
FIG. 3 is an orthogonal view of a system including a hand held scanner, x-y digitizer and computer display screen in accordance with an embodiment of the present invention.

In FIG. 3, the hand-held scanner 16 is freely moveable over the digitizer work surface 26. In this embodiment, the digitizer work surface 26 is built into the larger work surface 27. Alternatively, the digitizer work surface 26 could be provided as a mat or pad-type digitizer that rests on top of the larger work surface 27. The digitizer pen 36 is used to edit the original version of a document (not shown) that has been secured to the digitizer work surface 26 by means of mechanical fasteners, mechanical stops, adhesive tape, or the like (not shown). A computer display screen 41 is provided in order to display the electronic version of the original document, and to display any edits that are made to the document.

When a hand-held scanner is used, the digitizer pad may be used to sense the location and orientation of the scanner head whenever it is placed on the digitizer work surface. As the scanner head is passed across the secured document, the location and orientation of the scan head is known and the scanned data collected on multiple passes of the scanner head can be stitched together with redundant scanned data being discarded. In this way, a single accurate digital image of the document is produced.

The apparatus of the present invention also includes a control unit such as a microcomputer, central processing unit or the like for controlling the scanning, digitizing, storage, transmission and display functions of the system. The control unit may also control the function of correlating the position of the original and electronic documents in order to ensure that the documents correspond in scale, rotation and offset. The control unit may be provided with suitable software for carrying out the various control functions.

Other peripheral equipment such as printers, modems, drafting tools, etc. may be added to the system of the present invention.

The operation of the system of the present invention is more fully described as follows. Initially, an electronic version of a document is provided by various methods. The term "electronic" document as used in accordance with the present invention encompasses various types of machine-readable documents. In a preferred method, an original hardcopy of a document is scanned into digital form and stored by conventional bit mapping or raster techniques, as commonly used in facsimile machines. Alternatively, the electronic document may be created by vector techniques, ASCII coded character data or other conventional coding methods. Such alternative methods may be particularly suitable for documents such as, for example, engineering drawings that typically require less computer memory when provided in vector form than in bit mapped form. The electronic version of the document may initially be created by such means as word processing, computer-aided design (CAD), digital photography and the like. The initial electronic version of the document may then be printed or reproduced by other means to provide a hardcopy of the document.

A computer is preferably used to store the electronic version of the document in digital or bit mapped form. The computer is also used to store the digitized edits that are subsequently made to the original document. Preferably, the unedited electronic document is stored separately from the digitized edit in order to more easily retrieve both the edited and unedited versions of the electronic document. Furthermore, if multiple editing inputs such as different pen colors are used, it is preferred to store each of the various editing inputs separately in order to retrieve individual edits. For example, where different pen colors are used to indicate edits made by different persons, each of the different edits may be stored separately in order to retrieve the individual edits. As more fully described below, the use of different colors for edits made at different locations allows the edits made by various individuals to be separately identified.

Once the document is provided in both original and electronic form, the original version of the document is positioned in a fixed location on an x-y digitizer. The original document is fastened to the digitizer by means of mechanical clips, mechanical stops, magnetic clips, adhesive tape and the like, as discussed above. In an alternative embodiment, as shown in FIG. 3, the original document may be fastened to the x-y digitizer first, followed by scanning the document into electronic form using a moveable scanner.

After the original document has been secured to the x-y digitizer, the position of the original document is correlated with the electronic version of the document. This correlation ensures that edits made on the original document will appear at the corresponding location on the displayed image of the electronic document. Various methods may be utilized for correlating the scale, rotation and offset of the documents. In one embodiment, an original document of known size is placed on the x-y digitizer in a known rotational orientation. For example, a standard size 8.5×11 inch document may be placed squarely on an x-y digitizer pad such that the edges of the document are aligned with the x and y axes of the digitizer. In this embodiment, the corresponding scale, rotation and offset of the electronic version of the document may be established by the initial scanning operation. If the original 8.5×11 inch document is fed into the scanner with known magnification, and the document is then placed on the digitizer in a known orientation (e.g., against stops), the scale, rotation and offset of the documents can automatically be correlated. The apparatus shown in FIG. 2 may be used in this manner to both scan an original document into digital form, and to deposit the original document on an x-y digitizer in a known location such that the scale, rotation and offset of the original and electronic documents are automatically correlated. As shown in FIG. 2, the mechanical stops 22, 23 and 24 may be used to position a standard size document in a known location on the x-y digitizer.

Correlation of the position of the original and electronic documents may alternatively be accomplished by identifying at least one point on the original document and identifying the same point on the displayed image of the electronic document. In this embodiment, the scale, rotation and offset of the documents are correlated by a set-up routine that involves the location of corresponding points on the original and displayed documents. If the scale and rotation of the document are known, it is possible to identify one point on the original document and the corresponding point on the displayed version of the electronic document in order to calculate the position offset of the document on the digitizer surface. If the rotation of the document on the digitizer surface is known, as it would be for a document printed squarely on a sheet of paper and with the paper positioned against mechanical stops on the digitizer surface, it is possible to calculate the scale factors and offsets by identifying two points on the original document and the corresponding two points on the displayed image. Finally if none of the positioning parameters are known, it is possible to calculate the rotation, scale, and offset for the original document relative to the displayed document by identifying three points on the original and the corresponding three points on the displayed document. The formulas for making these calculations are given below.

The following derivations assume that the digitizer X and Y scale factors are the same, but that the display X and Y scale factors may be different. If the X an Y scale factors for the display are the same, the calculations can be simplified.

If the X and Y scale factors between the digitizer and display coordinate systems are known and there is no rotational offset between the two systems the translational offset can be computed from one point identified in both coordinate systems. If the coordinates of the identified point in the display system are XDSP1,YDSP1 and in the digitizer system are XDIG1,YDIG1 then the translational offsets are calculated by:

$$X\text{offset}=(X\text{DSP}1/X\text{scale})-X\text{DIG}1$$

$$Y\text{offset}=(Y\text{DSP}1/Y\text{scale})-X\text{DIG}1$$

The transformation from the digitizer coordinate system to the display coordinate system can then be made using the formulas below:

$$X\text{DSP}=X\text{scale}(X\text{DIG}+X\text{offset})$$

$$Y\text{DSP}=Y\text{scale}(Y\text{DIG}+Y\text{offset})$$

If the rotational offset between the digitizer and display coordinate systems is 0 but the X and Y scale factors are not known, the transformation parameters can be calculated from two points identified in both systems. Using the same labeling conventions as above:

$$X\text{scale}=(X\text{DSP}2-X\text{DSP}1)/(X\text{DIG}2-X\text{DIG}1)$$

$$Y\text{scale}=(Y\text{DSP}2-Y\text{DSP}1)/(Y\text{DIG}2-Y\text{DIG}1)$$

$$X\text{offset}=(X\text{DSP}1/X\text{scale})-X\text{DIG}1$$

$$Y\text{offset}=(Y\text{DSP}1/Y\text{scale})-X\text{DIG}1$$

Figure 4:
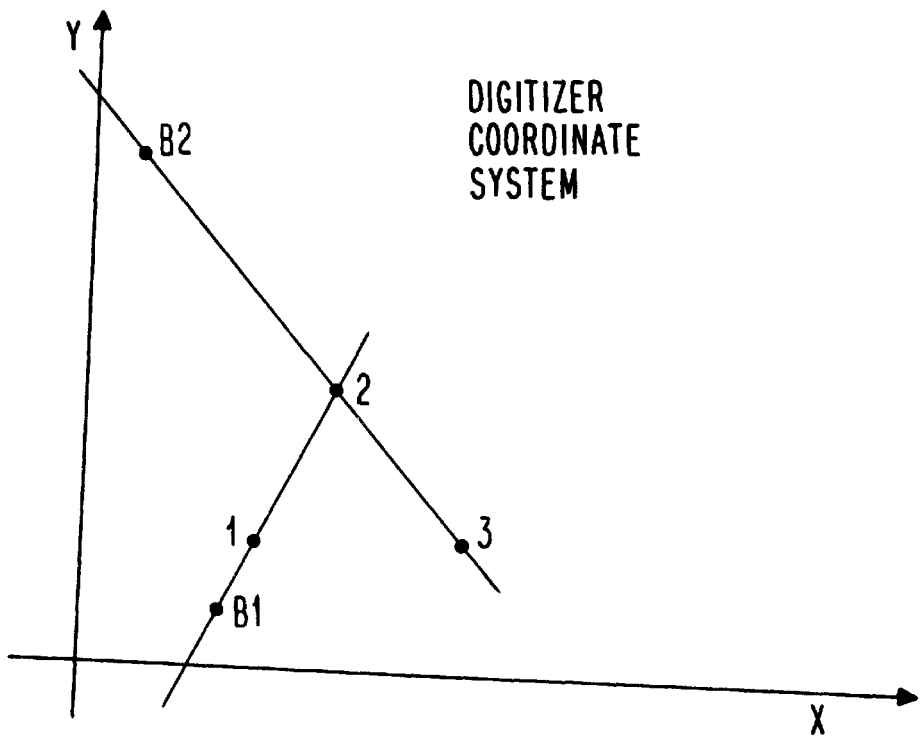
FIG. 4 is an illustration of part of a set-up routine for correlating the position of an original document to be edited with an electronic version of the document in accordance with the present invention.
Figure 4:
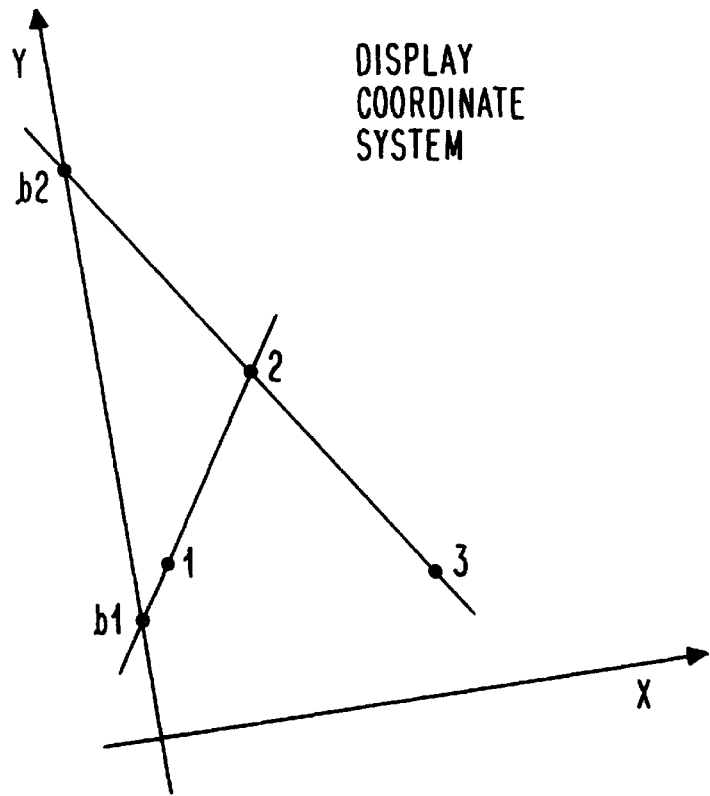

If there is rotational offset between the coordinate systems and the translational offset and X and Y scale factors are unknown, three points may be identified in both systems in order to develop an accurate transformation from one coordinate system to the other. In FIG. 4 the points 1, 2, and 3 are identified in the digitizer and display coordinate systems. The Y scale is calculated by projecting the lines through points 1 and 2, and points 2 and 3 until they intercept with the Y axis of the display coordinate system at points b1 and b2 respectively. The Y coordinates of b1 and b2 can be found using the equation for a straight line:

$$y = m*x + b$$

where: m=the slope of the line
b=the Y axis intercept

The Y coordinate of b1 calculated from the known coordinates of points 1 and 2 is therefore:

$$YDSPb1 = YDSP1 - XDSP1*(YDSP2-YDSP1)/(XDSP2-XDSP1)$$

The Y coordinate of b2 can be calculated similarly.

These points b1 and b2 are then mapped into the digitizer coordinate system. In the digitizer system the points corresponding to b1 and b2 are shown as B1 and B2 in FIG. 4. They are located by extending the lines in the digitizer system through points 1 and 2 and through points 2 and 3. The distance from point 1 to B1 can be calculated by using the ratios of the distances between b1 and point 1 and points 1 and 2 in the display coordinate system. The formula is given below:

$$Dist1B1 = Dist1b1*(DistDIG12/DistDSP12)$$

where: Dist1B1=distance from point 1 to B1 in the digitizer system
Dist1b1=distance from point 1 to b1 in the display system
DistDIG12=distance from point 1 to point 2 in the digitizer system
DistDSP12=distance from point 1 to point 2 in the display system The coordinates of the point B1 can then be calculated by:

$$XDIGB1 = XDIG1 - Dist1B1*(XDIG2-XDIG1)/DistDIG12$$

$$YDIGB1 = YDIG1 - Dist1B1*(YDIG2-YDIG1)/DistDIG12$$

where: XDIGB1=X coordinate of B1
YDIGB1=Y coordinate of B1
XDIG1=X coordinate of point 1 in the digitizer system
YDIG1=Y coordinate of point 1 in the digitizer system
XDIG2=X coordinate of point 2 in the digitizer system
YDIG2=Y coordinate of point 2 in the digitizer system The coordinates of the point B2 can be calculated in a similar manner.

The Y scale factor can now be calculated:

$$Yscale = \text{distance } b1 \text{ to } b2 \text{ /distance } B1 \text{ to } B2$$

Because the points b1 and b2 both lie on the Y axis, there is no X component in the distance between them. Because the X and Y scales for the digitizer are assumed to be equal, the distance between B1 and B2 is appropriate to use in this scale factor calculation.

Figure 5:
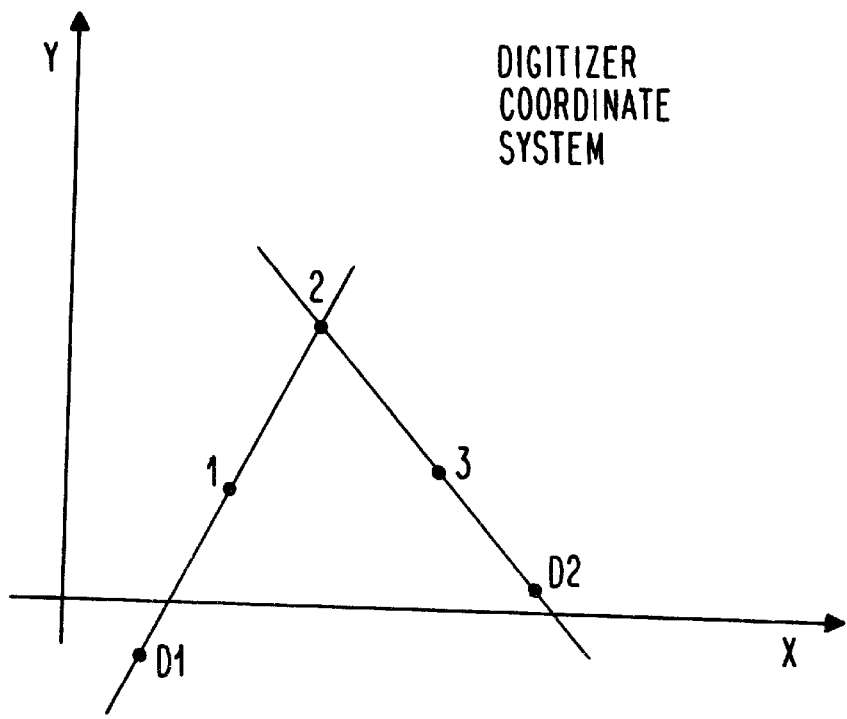
FIG. 5 is another illustration of part of a set-up routine for correlating the position of an original document to be edited with an electronic version of the document in accordance with the present invention.
Figure 5:
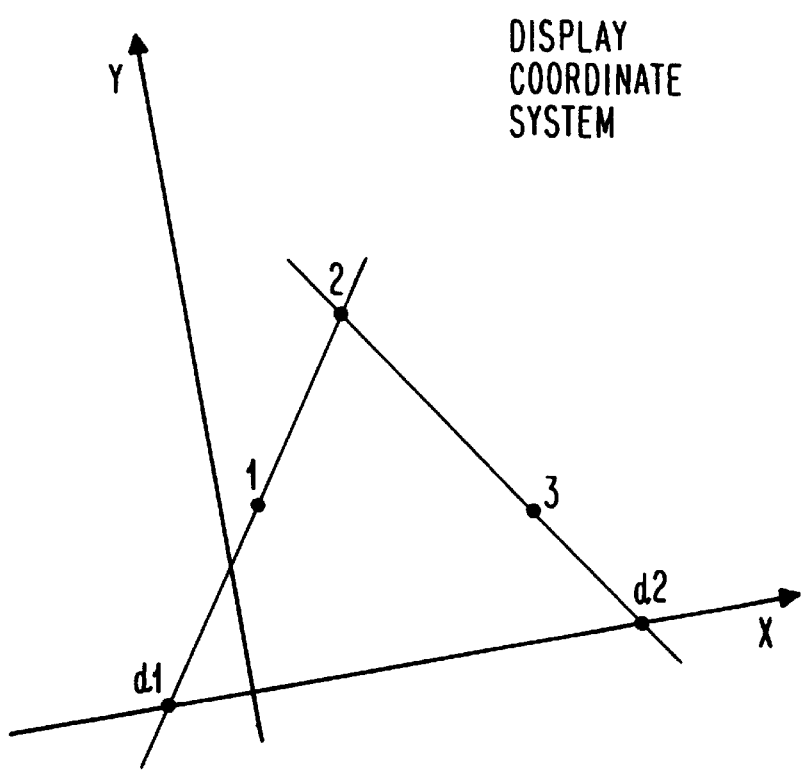

The X scale factor can be calculated in a similar fashion using X axis intercepts. FIG. 5 shows the construction for these calculations. Alternatively, once the Y scale has been computed, the X scale can be obtained from any distance which is known in both the display and digitizer coordinate systems which has an X component.

The translational offsets can be found using the X and Y intercept points b1, b2, d1 and d2. Points b1 and b2 lie on the Y axis of the display coordinate system and therefore the two points B1 and B2 define the location of the display system Y axis mapped into the digitizer system. Similarly, d1 and d2 lie on the display system X axis so that D1 and D2 define the location of the display system X axis in the digitizer system. The intersection of these two lines drawn through B1,B2 and D1,D2 is therefore the origin of the display coordinate system mapped into the digitizer system. The coordinates of this intersection are therefore the translational offsets.

The rotational offset between the two coordinate systems can also be obtained from intercept points which have been mapped from the display system into the digitizer system. The sine and cosine of the angle of rotation between the coordinate systems are shown below:

$$\sin \theta = (XDIGB2 - XDIGB1)/DistDIGB1B2$$

$$\cos \theta = (YDIGB2 - YDIGB1)/DistDIGB1B2$$

where: theta=angle of rotation between the two coordinate systems
DistDIGB1B2=distance between points B1 and B2

The rotational transformation is then computed using the formula:

$$YDSP = YDIG* \cos \theta - XDIG* \sin \theta$$

$$XDSP = XDIG* \cos \theta + YDIG* \sin \theta$$

When identifying corresponding points on the original and electronic documents, any suitable points may be used. For example, at least one corner of each document may be identified. Alternatively, the points may be located at various positions on each document, such as the first letter of written text, a period contained within the text, a specific object on a drawing, etc. When two or more points are to be located, it is preferred to maximize the distance between the points in order to minimize errors.

In order to perform the above-noted set-up routine for correlating the positions of the original and electronic documents, software is preferably used in a menu-driven format in which the set-up function is first selected from a menu, at least one point is identified on the original document positioned on the x-y digitizer, and at least one corresponding point is located on the displayed image of the electronic document. Points on the original document may be identified with the digitizer pen. When a point is selected on the original document using the digitizer pen, the x-y digitizer transforms that location into x-y coordinates. Points on the displayed electronic document may be identified with a cursor controlled by the same digitizer pen or other suitable device. Thus, the electronic version of the document may be displayed on a computer screen while a cursor located on the screen is moved to the same point on the electronic document as previously selected on the original document by the digitizer pen.

Once the positions of the original and electronic documents have been correlated, the original document may be edited by hand using the digitizer pen. It has been found in accordance with the present invention that operators typically prefer to make edits by marking directly on the hardcopy of a document rather than by moving a cursor over a computer screen as required in many prior art editing systems. Edits made directly on the original document are converted to digital form by the x-y digitizer. For example, where the digitizer pen comprises an inking insert and a tip switch, ink marks made on the original document are converted into digital form representing the x-y coordinates of the ink marking. The digitized edit is preferably stored in computer memory separate from the electronic version of the original document. The x-y coordinates of the digitized edit may then be combined with the corresponding x-y coordinates of the electronic version of the original document in order to provide an edited electronic document. Combination of the digitized edit and electronic version of the original document is preferably achieved by superimposing each x-y coordinate of the digitized edit on each corresponding x-y coordinate of the electronic version of the original document. Thus, for example, where a particular x-y coordinate of the electronic document is "black" and where the corresponding x-y coordinate of the digitized edit is "black", the resulting edited electronic document will be "black" at the particular x-y coordinate. As a further example, where a particular x-y coordinate of the electronic document is "black" and where the corresponding x-y coordinate of the digitized edit is "erase", the resulting edited electronic document will be erased at the particular x-y coordinate.

After the digitized edit has been added to the electronic document, the resulting edited electronic document may be displayed at at least one location. The location may be local or adjacent to the x-y digitizer such that persons editing the original document can view the corresponding edited electronic document locally on a computer display screen or the like. In addition, the edited electronic document may be displayed at locations remote from the x-y digitizer, in which case, the edited electronic document is transmitted to the remote location by telephone, computer network or any other suitable means. Where the edited document is displayed at remote locations, such locations may also be provided with an x-y digitizer that is likewise capable of editing the electronic document.

In accordance with a preferred embodiment of the present invention, a scrolling function may be provided which automatically scrolls and/or pans the electronic document to display a portion of the document that is being edited. This function is particularly useful where it is not practical to display an entire large document or where the display of the entire document would result in a loss of definition or clarity of the image. For example, if the electronic document is displayed on a computer screen, the screen may not be as large as the document. Instead of reducing the size of the document such that the entire document fits on the screen, it may be beneficial to retain or enlarge the scale of the document, and to display only a portion of the document on the computer screen. In this case, for example, the upper left hand portion of a document may originally be displayed on the computer screen. If edits are made on the upper left hand portion of the original document, there is no need to pan or scroll the displayed electronic document. However, if the digitizer pen is moved off the displayed area and is used to edit the lower right hand corner of the original document, the electronic document may be scrolled and/or panned to display the corresponding lower right hand corner of the document as it is being edited. This scrolling function is especially useful for large original documents such as engineering drawings that cannot easily be displayed in their entirety on a computer or other type of display screen. In this embodiment, the location of the digitizer pen on the x-y digitizer is used to initiate scrolling and/or panning commands that automatically cause the displayed electronic document to scroll and/or pan.

When the scrolling function is used with a system comprising multiple editing locations, such as teleconferencing systems, a trade-off function is preferably incorporated in which control of the scrolling function is exchanged between the multiple users. In this embodiment, at any given time one particular editing location controls the ability to scroll the displayed electronic document at all locations. This control can be passed to the various editing locations. For example, scrolling control may be provided to the location where hand editing on the original document is currently being performed.

In accordance with a preferred embodiment, various types of editing functions are performed with at least one digitizer pen. These various functions may include editing with multiple colors, highlighting and erasing. A single digitizer pen may be used to perform the various editing functions, in which case the operating software may include menu driven commands for selecting alternative colors, highlighters, erasers, etc. In addition, multiple digitizer pens may be used, each of which corresponds to an individual editing function. Various types of editing inputs may therefore be used at one location with at least one digitizer pen. Furthermore, for applications such as teleconferencing, operators at various remote locations can make edits that are identifiable with a given location or person. For example, editors at one location may use one color while editors at another location may use a different color. In this manner, the editing inputs from various persons and/or locations can be determined.

The system of the present invention may be provided in various forms. For example, in teleconferencing applications, the system may be provided as a complete unit including a scanner, a digitizer, a display screen, a central processing unit and software to run the various functions. Such systems may be provided at multiple locations and may communicate by telephone or computer network in order to provide document sharing capabilities for teleconferencing. Alternatively, the system may be provided as an add-on product to existing computer systems that incorporate conventional software. In this case, the system may include a scanner, digitizer and operating software that is compatible with conventional software. In this embodiment, an existing computer and display screen may be combined with the apparatus of the present invention to provide electronic document editing capabilities.

It is to be understood that the above description of the present invention is susceptible to various modifications, changes and adaptations by those skilled in the art, and that such modifications, changes and adaptations are to be considered within the spirit and scope of the invention, as set forth by the claims which follow.

What is claimed is:

1. An apparatus for editing documents comprising:
   (a) means for providing an electronic version of a hardcopy document;
   (b) an x-y digitizer having a digitizer surface for receiving the hardcopy document for editing of the hardcopy document, the digitizer comprising means for editing the hardcopy document received on the digitizer surface including means for marking directly on the hardcopy document, and means for providing a digitized version of the edit made to the hardcopy document;
   (c) means for correlating the position of the hardcopy document received on said digitizer surface for editing with the electronic version of the hardcopy document;
   (d) means for combining the digitized version of the edit made to the hardcopy document and the electronic version of the hardcopy document as an edited electronic document;
   (e) wherein the means for correlating the position of the hardcopy document on the digitizer surface for editing with the electronic version of the hardcopy document comprises means for determining scale, rotation and offset of the hardcopy document on the digitizer surface with the electronic version of the hardcopy document;
   (f) wherein the means for determining the scale, rotation and offset of the hardcopy document comprises said marking means for identifying at least one point on the hardcopy document when said hardcopy document is received on said digitizer surface, said determining means further comprising:
  said means for providing a digitized version of the edit made to the hardcopy document for providing a digitized version of said at least one point identified on the hardcopy document;
  means independent of at least said digitizer surface for displaying an image of the electronic version of the hardcopy document;
  at least one identification means displayed on said displaying means;
  means for adjusting a location of said at least one identification means for positioning said at least one identification means at at least one point on said image of the electronic version of the hardcopy document corresponding to the at least one point identified on the hardcopy document by said marking means; and
  program means for processing said digitized version of said at least one point on the hardcopy document and said at least one point on said image of the electronic version of the hardcopy document to determine at least one of the scale, portion and offset of the hardcopy document; and
(g) wherein one point on the hardcopy document and one point on the image of the electronic version of the hardcopy document are identified when scale and rotation are known, and said program means determines the offset by solving the expressions:

$X\text{offset}=(XDSP1/X\text{scale})-XDIG1$ $Y\text{offset}=(YDSP1/Y\text{scale})-YDIG1$ where XDSP1 and YDSP1 are coordinated of the identified point on the displaying means and XDIG1 and YDIG1 are coordinates of the identified point on the x-y digitizer.

2. An apparatus according to claim 1, wherein the electronic version of the hardcopy document is provided in digital form.

3. An apparatus according to claim 1, wherein the means for providing an electronic version of an hardcopy document comprises a scanner adapted to scan the hardcopy document into digital form.

4. An apparatus according to claim 1, wherein the means for editing the hardcopy document comprises a digitizer pen including the means for marking directly on the hardcopy document.

5. An apparatus according to claim 4, wherein the digitizer pen comprises a tip switch adapted to actuate when sufficient pressure is applied by the digitizer pen to mark the hardcopy document.

6. An apparatus according to claim 1, wherein the means for determining the rotation of the hardcopy document comprises means for positioning the hardcopy document in a known rotational orientation on the x-y digitizer, wherein the positioning means comprises stop means extending outward from and in a predetermined position relative to said digitizer surface for receiving said hardcopy document in said known rotational orientation.

7. An apparatus according to claim 1, wherein the apparatus further comprises means for displaying the electronic version of the hardcopy document.

8. An apparatus according to claim 1, wherein the apparatus further comprises means independent of at least said digitizer surface for displaying an image of the edited electronic document at substantially the same time as said hardcopy document is edited by said marking means.

9. An apparatus according to claim 8, wherein the means for displaying the edited electronic document is provided at at least one location selected from locations local to the x-y digitizer and locations remote from the x-y digitizer.

10. An apparatus according to claim 1, wherein said apparatus further comprises storing means for storing at least one of the electronic version of the hardcopy document, the digitized version of the edit made to the hardcopy document and the edited electronic document.

11. An apparatus according to claim 8, wherein two points on said hardcopy document and two points on said image of the electronic version of the hardcopy document are identified when the rotation is known, and said program means determines the scale and offset by solving the expressions:

$X\text{scale}=(XDSP2-XDSP1)/(XDIG2-XDIG1)$ $Y\text{scale}=(YDSP2-YDSP1)/(YDIG2-YDIG1)$ $X\text{offset}=(XDSP1/X\text{scale})-XDIG1$ $Y\text{offset}=(YDSP1/Y\text{scale})-YDIG1$ where XDSP1, YDSP1 and XDSP2, YDSP2 are coordinates of the identified points on the displaying means and XDIG1, YDIG1 and XDIG2 and YDIG2 are coordinates of the identified points on the x-y digitizer.

12. An apparatus according to claim 1, wherein three points on said hardcopy document and three points on said image of said electronic version of the hardcopy document are identified when neither rotation, offset or scale are known, and said program means determines the scale, rotation and offset by solving the expressions:

$ydb1=yd1-xd1*(yd2-yd1)/(xd2-xd1)$ $Lg12=((yg2-yg1)2+(xg2-xg1)2)\frac{1}{2}$ $Ld12=((yd2-yd1)2+(yd2-yd1)2)2)\frac{1}{2}$ $L1b1=((yd1-ydb1)2+xd12)2)**\frac{1}{2}$ $L1B1=L1b1*(Lg12/Ld12)$ $xB1=xg1-L1B1*(xg2-xg1)/Lg12$ $yB1=yg1-L1B1*(yg2-yg1)/Lg12$ $ydb2=yd2-xd2*(yd3-yd2)/(xd3-xd2)$ $Lg23=((yg3-yg2)2+(xg3-xg2)2)2)\frac{1}{2}$ $Ld23=((yd3-yd2)2+(xd3-xd2)2)2)\frac{1}{2}$ $L2b2=((yd2-ydb2)2+xd22)2)\frac{1}{2}$ $L2B2=L2b2*(Lg23/Ld23)$ $xB2=xg2+/-L2B2*(xg3-xg2)/Lg23$ $yB2=yg2+/-L2B2*(yg3-yg2)/Lg23$ $y\text{scale}=(ydb2-ydb1)/((xB2-xB1)2+(yB2-yB1)2)2)\frac{1}{2}$ $xdd1-ydb1*(xd2-xd1)/(yd2-yd1)$ $Lg12=((yg2-yg1)2+(xg2-xg1)2)2)\frac{1}{2}$ $Ld12=((yd2-yd1)2+(yd2-yd1)2)2)\frac{1}{2}$ $L1d1=((yd)2+(xd1-xdd1)2)2)\frac{1}{2}$ $L1D1=I1d1*(Lg12/Ld12)$ $xD1=xg1-L1D1*(xg2-xg1)/Lg12$ $yD1 = yg1 - L1D1*(yg2-yg1)/Lg12$ $Lg23 = ((yg3-yg2)2+(xg3-xg2)2)½$ $Ld23 = ((yd3-yd2)2+(xd3-xd2)2)½$ $L2d2 = ((yd2)2+(xd2-xdd2)2)**½$ $L2D2 = L2d2*(Lg23/Ld23)$ $xdd2 = -ydb2*(xd3-xd2)/(yd3-yd2)$ $xD2 = xg2+/-L2D2*(xg3-xg2)/Lg23$ $yD2 = yg2+/-L2D2*(yg3-yg2)/Lg23$ $X\text{scale} + (xdd2-xdd1)/((xD2-xD1)2+(yD2-YD1)2)**½$ $SlpB = (yB2-yB1)/(xB2-xB1)$ $IntB = yB2 - SlpB*xB2$ $SlpD = (yD2-yD1)/(xD2-xD1)$ $IntD = yD2 - SlpD*xD2$ $y = SlpB\ x + IntB$ $-y = SlpD\ x - IntD$ $O = (SlpB-SlpD)x + (IntB-IntD)$ $x = X\text{offset} = (IntD-IntB)/(SlpB-SlpD)$ $Y\text{offset} = X\text{offset}*SlpB + IntB$ $\sin\theta = (xB2-xB1)/((xB1-xB2)2+(yB1-yB2)2)½$ $\cos\theta = (yB2-yB1)/((xB1-xB2)2+(yB1-yB2)2)½$ $x\text{rotate} = x\text{dig}*\cos\theta - y\text{dig}*\sin\theta$ $y\text{rotate} = y\text{dig}*\cos\theta + x\text{dig}*\sin\theta$ $xdsp = X\text{scale}*(x\text{rotate} + X\text{offset})$ $ydsp = y\text{scale}*(y\text{rotate} + Y\text{offset})$ where xd1, yd1; xd2, yd2 and xd3, yd3 are coordinates of the identified points on the displaying means; xg1,yg1; xg2, yg2 and xg3, yg3 are coordinates of the identified points on the x-y digitizer; b1, b2 are the intercept points of lines through points 1 and 2, and points 2 and 3 with the y-axis on the x-y digitizer; B1 B2 are points on the displaying means corresponding to points b1, b2; L is distance; Slp is slope; Int is intercept; d1, d2 are the intercept points of lines through points 1 and 2, and points 2 and 3 with the x-axis on the x-y digitizer; D1, D2 are points on the displaying means corresponding to points d1, d2.

13. A method for editing documents comprising the steps of:

(a) providing an electronic version of a hardcopy document;

(b) positioning the hardcopy document on a surface of an x-y digitizer for editing of the hardcopy document;

(c) correlating the positioning of the hardcopy document received on the digitizer surface for editing with the electronic version of the hardcopy document;

(d) editing directly on the hardcopy document received on the digitizer surface;

(e) digitizing the edit made to the hardcopy document;

(f) combining the digitized edit made to the hardcopy document and the electronic version of the hardcopy document to produce an edited electronic document;

(g) wherein correlating the position of the hardcopy document with the electronic version of the hardcopy document comprises determining scale, rotation and offset of the hardcopy document and correlating the scale, rotation and offset of the hardcopy document with electronic version of the hardcopy document;

(h) wherein at least one of the scale, rotation and offset of the hardcopy document is determined by identifying at least one point on the hardcopy document, digitizing the at least one point identified on the hardcopy document, displaying independent of at least said digitizer surface an image of the electronic version of the hardcopy document, displaying at least one identification means on the image of the electronic version of the hardcopy document, adjusting a location of said at least one identification means for positioning said at least one identification means at at least one point on the image of the electronic version of the hardcopy document corresponding to the position of the at least one point identified on the hardcopy document and processing via a program means, said digitized version of said at least one point on the hardcopy document and said at least one point on said image of the electronic version of the hardcopy document to determine at least one of the scale, rotation and offset of the hardcopy document; and (i) wherein one point on the hardcopy document and one point on the image of the electronic version of the hardcopy document are identified when scale and rotation are known, and said program means determines the offset by solving the expressions;

$X\text{offset} = (XDSP1/X\text{scale}) - XDIG1$ $Y\text{offset} = (YDSP1/Y\text{scale}) - YDIG1$ where XDSP1 and YDSP1 are coordinates of the identified point on the displaying means and XDIG1 and YDIG1 are coordinates of the identified point on the x-y digitizer.

14. A method according to claim 13, wherein the electronic version of the hardcopy document is provided by scanning the hardcopy document into digital form.

15. A method according to claim 13, wherein a digitizer pen is used to edit the hardcopy document and to digitize the edit made to the hardcopy document.

16. A method according to claim 14, wherein the rotation of the hardcopy document is determined by positioning the hardcopy documents in a known rotational orientation on the x-y digitizer relative to stop means extending outward from and in a predetermined position relative to said digitizer surface.

17. A method according to claim 13, further comprising the step of displaying the electronic version of the hardcopy document.

18. A method according to claim 13, further comprising the step of displaying independent of at least said digitizer surface the edited electronic document and at substantially the same time as said hardcopy document is being edited directly thereon.

19. A method according to claim 18, wherein the edited electronic document is displayed at at least one location selected from locations local to the x-y digitizer and locations remote from the x-y digitizer.

20. A method according to claim 12, wherein at least one control unit is used to store the electronic version of the hardcopy document, the digitized edit made to the hardcopy document and the edited electronic document.

21. A method according to claim 13, wherein two points on said hardcopy document and two points on said image of the electronic version of the hardcopy document are identified when the rotation is known, and said program means determines the scale and offset by solving the expressions:

$$X\text{scale}=(XDSP2-XDSP1)/(XDIG2-XDIG1)$$

$$Y\text{scale}=(YDSP2-YDSP1)/(YDIG2-YDIG1)$$

$$X\text{offset}=(XDSP1/X\text{scale})-XDIG1$$

$$Y\text{offset}=(YDSP1/Y\text{scale})-YDIG1$$

where XDSP1, YDSP1 and XDSP2 and YDSP2 are coordinates of the identified points on the displaying means and XDIG1, YDIG1 and XDIG2 and YDIG2 are coordinates of the identified points on the x-y digitizer.

22. A method according to claim 17, wherein three points on said hardcopy document and three points on said image of said electronic version of the hardcopy document are identified when neither rotation, offset or scale are known, and said program means determines the scale, rotation and offset by solving the expressions:

$$ydb1=yd1-xd1*(yd2-yd1)/(xd2-xd1)$$

$$Lg12=((yg2-yg1)2+(xg231\ xg1)2)**\tfrac{1}{2}$$

$$Ld12=((yd2-yd1)2+(yd2-yd1)2)**\tfrac{1}{2}$$

$$L1b1=((yd1-ydb1)2+xd12)**\tfrac{1}{2}$$

$$L1B1=L1b1*(Lg12/Ld12)$$

$$xB1=xg1-L1B1*(xg2-xg1)/Lg12$$

$$yB1=yg1-L1B1*(yg2-yg1)/Lg12$$

$$ydb2=yd2-xd2*(yd3-yd2)/(xd3-xd2)$$

$$Lg23=((yg3-yg2)2+(xg3-xg2)2)**\tfrac{1}{2}$$

$$Ld23=((yd3-yd2)2+(xd3-xd2)2)**2)\tfrac{1}{2}$$

$$L2b2=((yd2-ydb2)2+xd22)**\tfrac{1}{2}$$

$$L2B2=L2b2*(Lg23/Ld23)$$

$$xB2=xg2+/-L2B2*(xg3-xg2)/Lg23$$

$$yB2=yg2+/-L2B2*(yg3-yg2)/Lg23$$

$$y\text{scale}=(ydb2-ydb1)/((xB2-xB1)2+(yB2-yB1)2)**\tfrac{1}{2}$$

$$xdd1-ydb1*(xd2-xd1)/(yd2-yd1)$$

$$Lg12=((yg2-yg1)2+(xg2-xg1)2)**\tfrac{1}{2}$$

$$Ld12=((yd2-yd)2+(yd2-yd1)2)**\tfrac{1}{2}$$

$$L1d1=((yd1)2+(xd1-xdd1)2)**\tfrac{1}{2}$$

$$L1D1=L1d1*(Lg12/Ld12)$$

$$xD1=xg1-L1D1*(xg2-xg1)/Lg12$$

$$yD1=yg1-L1D1*(yg2-yg1)/Lg12$$

$$Lg23=((yg3-yg2)2+(xg3-xg2)2)**\tfrac{1}{2}$$

$$Ld23=((yd3-yd2)2+(xd3-xd2)2)**\tfrac{1}{2}$$

$$L2d2=((yd2)2+(xd2-xdd2)2)**\tfrac{1}{2}$$

$$L2D2=L2d2*(Lg23/Ld23)$$

$$xdd2=-ydb2*(xd3-xd2)/(yd3-yd2)$$

$$xD2=xg2+/-L2D2*(xg3-xg2)/Lg23$$

$$yD2=yg2+/-L2D2*(yg3-yg2)/Lg23$$

$$X\text{scale}=(xdd2-xdd1)/((xD2-xD1)2+(yD2-YD1)2)**\tfrac{1}{2}$$

$$SlpB=(yB2-yB1)/(xB2-xB1)$$

$$IntB=yB2-SlpB*xB2$$

$$SlpD(yD2-yD1)/(xD2-xD1)$$

$$IntD=yD2-SlpD*xD2$$

$$y=SlpBx+IntB$$

$$-y=SlpDx-IntD$$

$$O=(SlpB-SlpD)x+(IntB-IntD)$$

$$x=X\text{offset}=(IntD-IntB)/(SlpB-SlpD)$$

$$Y\text{offset}=X\text{offset}*SlpB+IntB$$

$$\sin\theta=(xB2-xB1)/((xB1-xB2)2+(yB1-yB2)2)**\tfrac{1}{2}$$

$$\cos\theta=(yB2-yB1)/((xB1-xB2)2+(yB1-yB2)2)**\tfrac{1}{2}$$

$$x\text{rotate}=x\text{dig}*\cos\theta-y\text{dig}*\sin\theta$$

$$y\text{rotate}=y\text{dig}*\cos\theta+x\text{dig}*\sin\theta$$

$$xdsp=X\text{scale}*(x\text{rotate}+X\text{offset})$$

$$ydsp=y\text{scale}*(y\text{rotate}+Y\text{offset})$$

where xd1, yd1; xd2, yd2 and xd3, yd3 are coordinates of the identified points on the displaying means; xg1, yg1; xg2, yg2 and xg3, yg3 are coordinates of the identified points on the x-y digitizer; b1, b2 are the intercept points of lines through points 1 and 2, and points 2 and 3 with the y-axis on the x-y digitizer; B1 B2 are points on the displaying means corresponding to points b1, b2; L is distance; Slp is slope; Int is intercept; d1, d2 are the intercept points of lines through points 1 and 2, and points 2 and 3 with the x-axis on the x-y digitizer; D1, D2 are points on the displaying means corresponding to points d1, d2.

* * * * *

UNITED STATES PATENT AND TRADEMARK OFFICE
CERTIFICATE OF CORRECTION

PATENT NO. : 5,897,648
DATED : April 27, 1999
INVENTOR(S) : Phillip L. Henderson It is certified that error appears in the above-indentified patent and that said Letters Patent is hereby corrected as shown below:

Col. 13, line 24 "portion" should be deleted and --rotation-- should be inserted.
Col. 13, line 34, "coordinated" should be deleted and replaced with --coordinates--.
Col. 14, line 10, claim 11 should be dependent from claim --1-- and "8" should be deleted.
Col. 14, line 37, claim 12, in the third line of code, one instance of "2)" should be deleted.**
Col. 14, line 39, claim 12, in the fourth line of code, one instance of "2)" should be deleted.**
Col. 14, line 47, claim 12, in the ninth line of code, one instance of "2)" should be deleted.**
Col. 14, line 49, claim 12, in the tenth line of code, one instance of "2)" should be deleted.**
Col. 14, line 51, claim 12, in the eleventh line of code, one instance of "2)" should be deleted.**
Col. 14, line 57, claim 12, in the fifteenth line of code, one instance of "2)" should be deleted.**
Col. 14, line 59, claim 12, in the sixteenth line of code, please insert -- = -- between the first instance of "xdd1" and "-ydb1".
Col. 14, line 61, claim 12, in the seventeenth line of code, one instance of "2)" should be deleted.**
Col. 14, line 63, claim 12, in the eighteenth line of code, one instance of "2)" should be deleted.**
Col. 14, line 65, claim 12, in the nineteenth line of code, after "((yd" and before ")", please insert --1--.
Col. 14, line 65, claim 12, in the nineteenth line of code, one instance of "2)" should be deleted.**
Col. 15, line 3, claim 12, in the twenty-third line of code, one instance of "2)" should be deleted.**
Col. 15, line 6, claim 12, in the thirty-first line of code, after "SlpB" the "-" should be deleted and replaced with -- = --.
Col. 16, line 44, claim 16 should be dependent from --13-- and "14" should be deleted.
Col. 16, line 62, claim 20 should be dependent from claim --13-- and "12" should be deleted.
Col. 17, line 16, claim 22 should be dependent from claim --13-- and "17" should be deleted.
Col. 17, line 38, claim 22, the tenth line of code, "2)" should be deleted.

UNITED STATES PATENT AND TRADEMARK OFFICE
CERTIFICATE OF CORRECTION

PATENT NO. : 5,897,648
DATED : April 27, 1999
INVENTOR(S) : Phillip L. Henderson It is certified that error appears in the above-indentified patent and that said Letters Patent is hereby corrected as shown below:

Col. 17, line 48, claim 22, the sixteenth line of code, after the first instance of "xdd1" and before "-ydb1" please insert -- = --.
Col. 18, line 20, claim 22, the thirty-third line of code, between "SlpD" and "(yD2-yD1)" please insert -- = --.

Signed and Sealed this

Twenty-third Day of November, 1999

Attest:

Q. TODD DICKINSON

*Attesting Officer*   *Acting Commissioner of Patents and Trademarks*